United States Patent Office 3,067,727
Patented Dec. 11, 1962

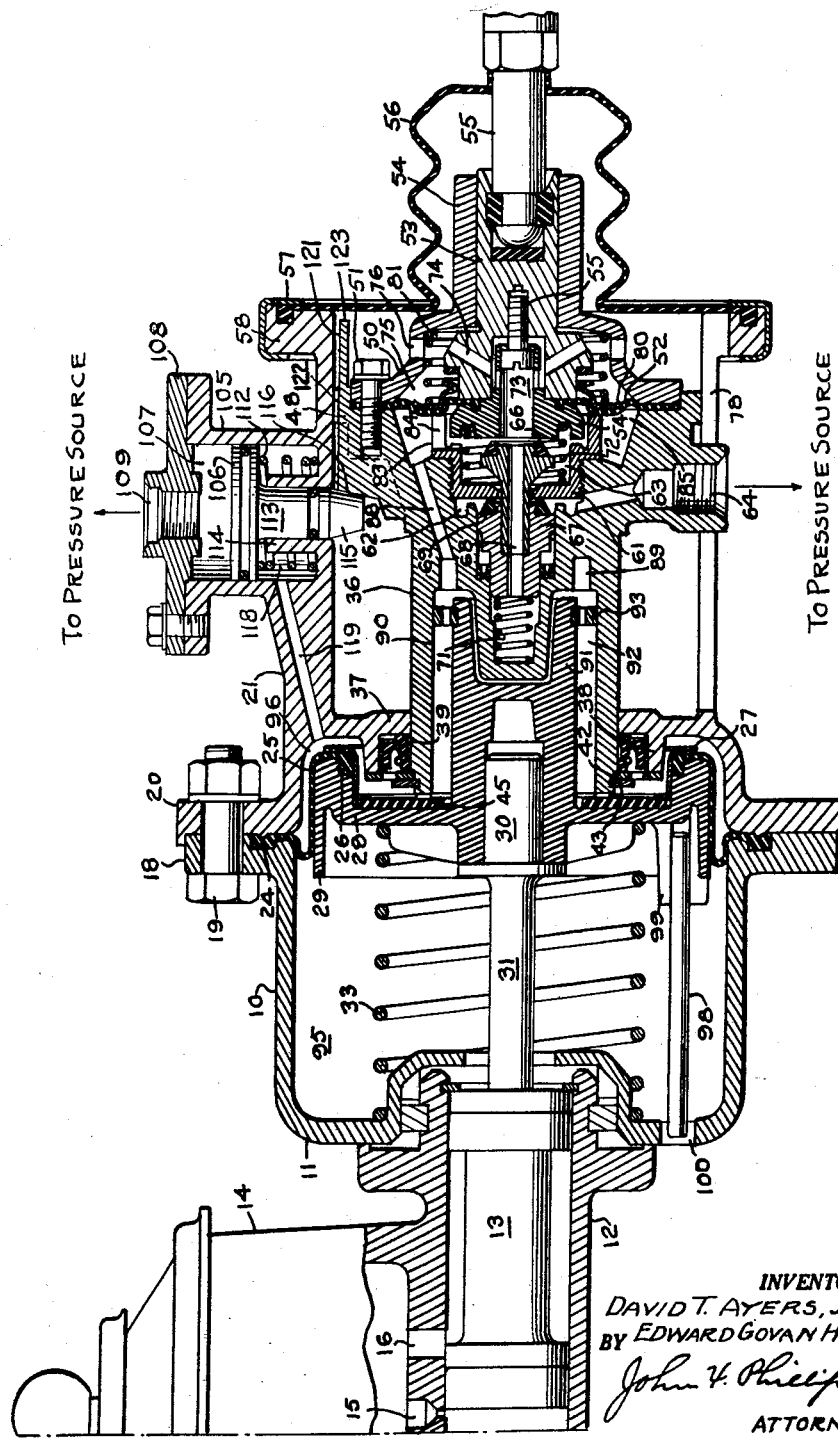

3,067,727
POWER BRAKE MECHANISM
David T. Ayers, Jr., and Edward Govan Hill, Birmingham, Mich., assignors to Kelsey-Hayes Company, Romulus, Mich., a corporation of Delaware
Filed Oct. 5, 1961, Ser. No. 143,156
15 Claims. (Cl. 121—38)

This invention relates to a power brake mechanism for motor vehicles and is an improvement over the structure shown in the copending application of David T. Ayers, Jr., Serial No. 137,397, filed September 11, 1961.

In the copending application referred to there is shown a novel type of vehicle brake mechanism wherein the brake pedal normally partakes of limited travel to operate the valve mechanism to energize a brake-applying fluid pressure motor, all of the braking pressures being generated by the motor and normally not by the application of foot-applied forces to the brake pedal. In such mechanism, a normally stationary valve housing is provided, having valve seats cooperating with pedal operable valves for supplying fluid pressure to the motor, and it is necessary merely for the operator to slightly move the brake pedal to disconnect the pressure chamber of the motor from the atmosphere and to connect the pressure chamber of the motor to a source of pressure to effect application of the brakes. The operator is apprised by the "feel" in the brake pedal of the degree of brake application, pressure operated reaction means being provided for this purpose.

In the prior construction the normally stationary valve housing is biased to a normal position from which it is movable axially by pedal forces for the manual application of the brakes in the event of a failure in the supply of pressure to the brake-applying motor. The system referred to is highly effective for performing its intended functions, as described, but the application of sudden forces to the brake pedal may overcome the biasing spring which urges the valve housing to normal position, which movement of the valve housing is unnecessary under normal operating conditions.

An important object of the present invention is to provide a system of the character referred to above having means for positively holding the valve housing in normal position during normal operation of the mechanism, the valve housing being automatically releasable in the event of a failure of pressure in the source.

A further object is to provide such a mechanism wherein a locking element normally prevents movement of the valve housing and in which the locking element is held in operative position by pressure in the source, the locking element being biased to an inoperative position so that it moves to such position upon a failure in pressure in the source whereby pedal forces will move the valve housing to effect manual application of the brakes.

A further object is to provide such a mechanism which is capable of operating under emergency conditions if there is a partial failure in pressure in the source, or if a maximum brake application is desired.

Other objects and advantages in the invention will become apparent in the course of the following description.

In the drawing the FIGURE is an axial sectional view through the complete motor mechanism, a portion of the master cylinder and a portion of the pedal operable rod for controlling the valve mechanism being shown.

Referring to the drawing, the numeral 10 designates a motor cylinder having a head 11 at one end, to which is secured in any suitable manner a conventional master cylinder 12. The master cylinder has the usual plunger 13 therein, and a supply of hydraulic brake fluid is maintained in a reservoir 14 and is supplied to the master cylinder through the usual ports 15 and 16.

The cylinder 10 is flanged as at 18 to be bolted as at 19 to a flange 20 formed on a casing 21 of generally cylindrical form coaxial with the cylinder 10 and extending therefrom in the direction opposite the master cylinder. The bolts 19 serve to clamp between the flanges 18 and 20 a bead 24 at the outer periphery of a rolling diaphragm 25, the inner periphery of which is beaded as at 26 and secured by a retainer 27 to a preferably cast motor piston body 28 having a peripheral flange 29 over which the diaphragm 25 is adapted to roll. The piston body 28 has a hub portion to be referred to, in one end of which is arranged a pilot stud 30 formed on a push rod 31, the forward or left-hand end of which is engaged in any suitable manner with the master cylinder plunger 13 to transmit movement thereto. The piston body 28 is biased to its normal off position shown by a return spring 33, and movement of the piston body 28 to off position is limited in a manner to be described.

A valve housing 36 is mounted within the casing 21. The left-hand end of such valve housing is cylindrical and slides through a bearing wall 37 formed integral with the casing 21. An annular flange 38, carried by the bearing 37, surrounds and houses a seal 39 to prevent leakage around the cylindrical portion of the housing 36.

A perforated plate 42 normally engages the end of the flange 38 and is retained in position by a snap ring 43. The valve housing 36 is subject to the biasing action of the spring 33, but the valve housing is normally locked in the position shown in the drawing by means referred to below. Movement of the valve housing to the right is limited by engagement of the plate 42 with the flange 38. The lefthand end of the housing 36 engages a rubber bumper 45 carried by the piston body 28, and such engagement limits movement of the piston body 28 to its off position shown.

Adjacent its right-hand or rear end, the valve housing 36 is provided with an annular flange 48 slidable in the casing 21. The flange 48 acts in the nature of a piston slidable in the housing 21, as will be obvious. The flange 48 thus guides the rear end of the valve housing 36 for axial movement, while the forward end of such housing is guided by the bearing 37.

A cap member 50 is fixed as at 51 to the right-hand end of the valve housing 36 and clamps thereagainst a reaction diaphragm 52. The inner periphery of this diaphragm is clamped between an axially movable body 53 and a head 54 fixed thereto by a screw 55, and the body 53 is axially slidable in a concentric extension 54 integral with the cap 50. A push rod 55 is connected at one end to the axial member 53 and has its other end connected to a conventional brake pedal (not shown) preferably of the depending type. The extension 54 is surrounded by a rubber or similar boot 56 secured at one end to the push rod 55 and fixed at its other end by a retainer 57 to a flange 58 formed on the casing 21. This flange is adapted to be secured by suitable bolts (not shown) to the fire wall (not shown) of the motor vehicle.

A plug 61 is threaded in the valve housing 36 and forms at opposite sides thereof chambers 62 and 63, the former of which is in fixed communication with a port 64 connected to a source of suitable pressure, in this case preferably superatmospheric pressure.

The head 54 has its left-hand face adapted to serve as a seat engageable with a rubber or similar exhaust valve 66 carried by a two-part valve body 67 axially bored as at 68. The valve body 67 carries a rubber or similar pressure inlet valve 69 normally engaging the adjacent wall of the plug 61 to close communication between the chambers 62 and 63 around the adjacent stem of the valve body 67. The valves 66 and 69 are biased to their normal positions shown by a spring 71. A spring 72 is arranged between the plug 61 and head 54 to bias the latter to its off position shown, and it will be noted that the valve 66 is normally open to connect the chamber 63 with a bore 73 in the head 54, which bore communicates through passages 74 with a chamber 75 within the cap 50. This chamber, in turn, communicates as at 76 with the interior of the casing 21, and this casing is open to the atmosphere at the bottom through a longitudinal slot 78 through which slides the portion of the housing 36 in which the port 64 is formed.

A sheet metal backing plate 80 engages the right-hand side of the diaphragm 52 and a spring 81 biases to the left that portion of the diaphragm 52 engaged by the backing plate referred to. The opposite side of the diaphragm 52 is limited by engagement with the outer flange 83 of the plug 61, which flange is cut away as at 84 to afford communication between the chamber 63 and a chamber 85 formed in the valve housing 36.

A passage 88 in the valve housing 36 communicates at one end with the chamber 85 and at its opposite end with an annular groove 89 formed in the valve housing 36 at the inner end of a bore 90. The hub of the piston body 28 is formed as an inwardly extending axial portion 91 spaced from the bore 90 to form an annular chamber 92 to which pressure is supplied from the passage 88 in a manner to be described, upon operation of the valve mechanism. A perforated bearing 93 is carried by the extension 91 and is slidable in the bore 90 to guide the motor piston relative to the valve housing 36.

The piston body 28 and diaphragm 25 divide the motor cylinder 10 to provide an atmospheric chamber 95 and a working chamber 96 open to the chamber 92. Obviously, when pressure is supplied to the chamber 92, such pressure builds up in the working chamber 96 of the motor to move its piston to the left to operate the master cylinder piston 13.

A stroke indicating rod 98 is fixed at one end to the piston body 28 by being driven into a split integral sleeve portion 99 carried thereby. The motor chamber 95 communicates with the atmosphere through an opening 100, and the rod 98 projects through such opening to be visible when the motor is operated.

As previously stated the present mechanism is provided with means normally operative for locking the valve housing against movement to the left. The casing 21 is provided with a preferably integrally cast cylinder 105 in which is slidable a piston 106 subject to pressure thereabove in a chamber 107. This chamber is formed between the piston 105 and a cap 108, the latter of which is ported as at 109 for connection with the same source of pressure which is connected to the port 64.

The piston 106 is biased upwardly by a spring 112 and a depending stem 113, formed on the piston, is slidable in a sleeve 114 and is provided at its lower end with a tapered abutment 115. This abutment engages against a shoulder 116 formed on the flange 48, unless the biasing spring 112 moves the piston 106 upwardly incident to a failure in pressure in the chamber 107. A chamber 118, formed below the piston 106, communicates through a passage 119 with the motor chamber 96.

As previously stated, a pressure failure in the chamber 107 results in upward movement of the piston 106 to remove the abutment 115 from the path of travel of the shoulder 116. Under such conditions the valve housing 36 is free to move to the left as further described below. To prevent a restoration in pressure in the chamber 107 from moving the stem 113 downwardly and engaging the abutment with any portion of the flange 48 to prevent the latter from moving back to its normal position, the flange 48 in the radial plane of the abutment 115 is provided with a slide surface 121, the periphery of the flange 48 being notched as at 122 to allow the surface 121 to extend through the peripheral portion of the flange 48 and over an extension 123.

Operation

As stated above, the parts are shown in their normal positions in the figure, the valve 66 being opened and the valve 69 closed. Therefore, the chamber 63 is closed to the pressure source connected to the port 64. The motor chamber 96 is always in communication with the chamber 63, as pointed out above, and with the valve 66 open, the chamber 63 will communicate with the atmosphere through the bore 73, ports 74 and the interior of the casing 21. Obviously this casing is always open to the atmosphere through the slot 78.

When the brake is to be operated, the pedal will be slightly depressed to move the rod 55 to the left to engage the head 54 with the valve 66 to close the chamber 63 to the bore 73. Very slight additional movement will crack the valve 69, thus admitting pressure through the port 64 and chamber 62 to the chamber 63, thence through passages 88 and 92 to the motor chamber 96. The motor piston will then move to the left to transmit movement to the master cylinder piston 13 to displace fluid into the conventional wheel cylinders (not shown). It will be apparent that while the valve housing 36 is slidable in the bearing 37, it is normally locked against movement by the abutment 115. Operation of the valves 66 and 69 in the manner stated, therefore, does not effect any movement under normal operating conditions of the valve housing 36, this unit remaining in the position shown while the motor piston moves to the left.

Initial operation of the valve mechanism takes place with the motor piston moving against only slight resistance up to the point of initial engagement of the brake shoes with the drums. In other words, the motor chamber 96 expands relatively rapidly, and there will be no initial substantial building up of pressure in the chamber 63. What pressure is present, however, acts against the left-hand face of the head 54 outwardly of the valve 66 to slightly resist movement of the push rod 55 and hence of the brake pedal, thus providing an initial stage of pedal reaction which will be proportional to pressure in the motor chamber 96. This pressure, of course, will be proportional to hydraulic pressure generated by the master cylinder plunger 13.

As soon as the brake shoes engage the drums, there will be substantial resistance to movement of the plunger 13 and consequently of the motor piston 28, and for a given degree of opening of the valve 69, there will be a rapid rise in pressure in the chamber 96 which results in the transmission of substantially greater force from the piston 28 to the plunger 13 to develop the necessary hydraulic braking pressures. Such increased pressure in the motor chamber 96 is reflected in the chambers 63 and 85. During the initial stage of brake operation the diaphragm 52 will be seated against the adjacent end of the plug 61, being retained in such position by the spring 81. When pressure substantially increases in the chambers 63 and 85 incident to engagement of the brake shoes with the drums, the spring 81 will be caused to yield and pressure to the left of the diaphragm 52 moves this diaphragm to the right to take up the play between the plate 80 and the axially movable member 53. This provides a second stage of brake pedal reaction wherein pressures affecting both the diaphragm 52 and head 54 will be transmitted to the brake pedal. While this reaction pressure is proportionately higher than in the initial stage of reaction, it is nonetheless proportional to pressure in the motor chamber 96 and through the "feel" of the pedal, therefore, the operator is apprised as to the degree of brake application. The operator of course also feels the rate of vehicle deceleration and when he has caused braking pressures to increase to the desired point, he will permit the brake reaction pressures to back off the pedal sufficiently to close the valve 69 to place the valves in lap position unless and until it is desired to increase or decrease the braking pressure.

As previously stated, pressure in the chamber 107 maintains the abutment 115 in locking position against the shoulder 116. If by any chance the supply of pressure from the source should fail, a drop in pressure in the chamber 107 allows the spring 112 to move the piston 106 upwardly, thus moving the abutment 115 out of the path of travel of the flange 48. Upon operation of the brake pedal under such conditions, the valve 66 will close and the valve 69 open, and the head 54 will engage the plug 61 and manual force applied to the brake pedal will move the valve housing 36 and the end of the cylindrical portion thereof, engaging the bumper pad 45, will effect movement of the motor piston. Thus the plunger 13 will be manually operated to apply the brakes.

Assuming that there is a leak in the pressure line from the source so that pressure for operating the motor is reduced but not completely lost, operation of the valve mechanism will supply to the chamber 96 whatever pressure is available, and if the pressure in the chamber 96 rises to the pressure in the source, the pressure in the chamber 118 will equal pressure in the chamber 107. Under such conditions the spring 112 will move the piston 106 upwardly, thus unlocking the valve housing 36 for movement in the manner described above so that pedal forces can supplement whatever pressure is present in the chamber 96 to operate the brakes.

The motor is so designed with respect to the normally available pressure that the latter is sufficient under all normal operating conditions for the full application of the brakes. Under normal conditions therefore pressure in the motor chamber 96 hardly ever reaches the full pressure in the source and as a rule therefore pressure in the chamber 107 will exceed pressure in the chamber 118. Thus ordinarily when the full normal pressure of the source is available, the abutment 115 remains in its operative locking position shown.

Assuming under extreme conditions that the source pressure, when normal, is not sufficient to deliver the maximum braking forces desired, the energization of the motor 10 up to its maximum by establishing in the chamber 96 a pressure equal to that in the source, such pressure will balance pressure in the chamber 107 and the sure will also exist in the chamber 118. Thus this presspring 112 will unlock the abutment 115 to allow pedal effort to be added to the pressure in the chamber 96 to operate the master cylinder plunger 13.

Assuming under any conditions in which such operation takes place, the abutment 115 is moved to unlocked position, the slide surface 121 will move beneath the abutment. If pressure in the chamber 107 should then exceed pressure in the chamber 118, the spring 112 will be overcome to tend to move the abutment 115 downwardly. With the valve housing 36 to the left of its normal position therefore, the abutment 115 will merely slidably engage the surface 121, this surface preventing the abutment from dropping behind any portion of the flange 48. Thereafter, when the valve housing is returned to normal position, the abutment 115 is free to drop to the normal locking position illustrated.

Operation of the parts when the brake pedal is released will be more or less obvious. Releasing the brake pedal results in movement of the head 54 and associated parts back to their normal positions. The spring 71 will close the valve 69 while the spring 72 will move the head away from the valve 66 to open such valve. Thus pressure from the source will be cut off from the chamber 96 and this chamber will be opened to the atmosphere. The motor piston 28 will be returned to normal position by the spring 33, and the valve housing will have remained in its normal position except under the extreme conditions referred to above. Assuming that the valve housing 36 has been moved to the left of its normal position during the previous brake operation, the spring 33, moving the piston body 28, will engage the bumper 45 with the housing 36 to return the latter to its normal position whereupon, if pressure is present in the chamber 107, the abutment 115 will return to normal position. If, when the brakes are released, pressure in the chamber 107 is below the normal pressure but substantially above that of the atmosphere, the piston 106 will move downwardly since the opening of the motor chamber 96 to the atmosphere established atmospheric pressure in the chamber 118.

The stroke indicating rod 96 may be provided as visual means to indicate the proper functioning of the master cylinder for applying the brakes.

From the foregoing it will be apparent that the present construction provides for the straight power operation of the brakes under normal operating conditions, without boosting by the brake pedal and without the necessity for the brake pedal's having to partake of substantial movement. It merely is necessary to push the brake pedal far enough to energize the motor and when the brakes have been applied to the desired extent, which will be apparent to the driver through vehicle deceleration and pedal reaction, the driver merely backs off very slightly on the pedal to establish the lap positions of the valves 66 and 69. Contrary to conventional practice the valve seats normally do not move. Under normal conditions therefore very little effort and pedal travel is necessary for a full brake operation.

However, if pressure in the source should fail partially or completely, it merely is necessary for the operator to push beyond the normal pedal travel to convert the mechanism into a brake booster by utilizing pedal forces to assist the motor piston. Regardless of whether the locking device remains operative or is unlocked, the releasing of the brake pedal returns all of the parts to their normal positions.

It is to be understood that the form of the invention shown and described is to be taken as a preferred example of the same and that various changes in the shape, size, and arrangement of the parts may be made as do not depart from the spirit of the invention or the scope of the appended claims.

We claim:

1. A motor mechanism comprising a fluid pressure motor having a pressure responsive member provided at one side thereof with a pressure chamber, a valve mechanism comprising a valve seat unit and a valve unit, one of said units being movable relative to the other unit to connect said pressure chamber to a source of pressure, said other unit having abutting engagement with said pressure responsive member and being mounted for coaxial movement with said pressure responsive member, control means subject to pressure in said source for locking said other unit against axial movement, and means operative upon a failure in pressure in said source for moving said control means to free said other unit for movement with said one unit to transmit movement to said pressure responsive member.

2. A motor mechanism comprising a fluid pressure motor having a pressure responsive member provided at one side thereof with a pressure chamber, a valve mechanism comprising a valve seat unit and a valve unit, one of said units being movable relative to the other unit to connect said pressure chamber to a source of pressure, said other unit having abutting engagement with said pressure responsive member and being mounted for coaxial movement with said pressure responsive member, control means subject to pressure in said source for locking said other unit against axial movement, and spring means biasing said control means to an unlocking position upon a failure of pressure in said source whereby said other unit will be freed to be moved by said one unit to effect movement of said pressure responsive member.

3. A motor mechanism comprising a fluid pressure motor having a pressure responsive member provided at one side thereof with a pressure chamber, a valve mechanism comprising a valve seat unit and a valve unit, one of said units being movable relative to the other unit to connect said pressure chamber to a source of pressure, said other unit having abutting engagement with said pressure responsive member and being mounted for coaxial movement with said pressure responsive member, a locking element having a normal position in the path of travel of said other unit to prevent movement of the latter upon operation of said one unit, a pressure responsive element connected to said locking element and subject to pressure in said source to maintain said locking element in said normal position, and means operative upon a failure in pressure in said source for moving said pressure responsive element to move said locking element out of the path of travel of said other unit whereby the latter will be moved by said one unit to transmit force therefrom to said pressure responsive member.

4. A motor mechanism according to claim 3 wherein said pressure responsive element is a piston, a cylinder in which said piston is movable having one end connected to said source, said means for moving said pressure responsive element upon a failure in pressure in said source comprising a spring arranged in the other end of said cylinder and engaging said piston.

5. A motor mechanism comprising a fluid pressure motor having a pressure responsive member provided at one side thereof with a pressure chamber, a valve mechanism comprising a valve seat unit and a valve unit, one of said units being movable relative to the other unit to connect said pressure chamber to a source of pressure, said other unit having abutting engagement with said pressure responsive member and being mounted for coaxial movement with said pressure responsive member, a housing surrounding said units, a locking element supported by said housing for sliding movement transverse to the direction of movement of said pressure responsive member and normally occupying a position in the path of travel of said other unit to prevent movement thereof, said housing having a control chamber connected to said source, a pressure responsive element having one side subject to pressure in said control chamber and connected to said locking element to maintain the latter in said normal position, and means biasing said pressure responsive element against pressure in said control chamber whereby when such pressure drops to a predetermined point, said pressure control element will move to transmit movement to said locking element to move it out of the path of said other unit whereby said one unit will move said other unit to transmit movement therethrough to said pressure responsive member.

6. A motor mechanism according to claim 5 wherein said housing is provided with a cylinder one end of which forms said control chamber, said pressure responsive element being a piston slidable in said cylinder, said biasing means comprising a spring arranged in the other end of said cylinder and engaging said piston to bias it for movement against pressure in said control chamber.

7. A motor mechanism comprising a fluid pressure motor having a pressure responsive member provided at one side thereof with a pressure chamber, a valve mechanism comprising a valve seat unit and a valve unit, one of said units being movable relative to the other unit to connect said pressure chamber to a source of pressure, said other unit having abutting engagement with said pressure responsive member and being mounted for coaxial movement with said pressure responsive member, control means subject to pressure in said source for locking said other unit against axial movement, means operative upon a failure in pressure in said source for moving said control means to free said other unit for movement with said one unit to transmit movement to said pressure responsive member, and means for utilizing pressure in said pressure chamber for assisting said last-named means in moving said control means to free said other unit for said movement.

8. A motor mechanism comprising a fluid pressure motor having a pressure responsive member provided at one side thereof with a pressure chamber, a valve mechanism comprising a valve seat unit and a valve unit, one of said units being movable relative to the other unit to connect said pressure chamber to a source of pressure, said other unit having abutting engagement with said pressure responsive member and being mounted for coaxial movement with said pressure responsive member, a pressure responsive device comprising a pressure responsive element having first and second chambers at opposite sides thereof the former of which is connected to said source, a locking element connected to said pressure responsive element and normally held in an operative position in the path of travel of said other unit by pressure in said first chamber, and biasing means in said second chamber engaging said pressure responsive element to move said locking element out of the path of travel of said other unit when pressure drops in said first chamber, whereby said other unit is movable by said one unit to transmit force to said pressure responsive member.

9. A motor mechanism according to claim 8 provided with a duct connecting said pressure chamber to said second chamber whereby pressure in said pressure chamber assists said biasing means in moving said pressure responsive element to move said locking element out of the path of travel of said other unit.

10. A motor mechanism comprising a fluid pressure motor having a pressure responsive member provided at one side thereof with a pressure chamber, a valve mechanism comprising a valve seat unit and a valve unit, one of said units being movable relative to the other unit to connect said pressure chamber to a source of pressure, said other unit having abutting engagement with said pressure responsive member and being mounted for coaxial movement with said pressure responsive member, a housing supporting said other unit for sliding movement coaxially with said pressure responsive member, a cylinder carried by said housing, a piston slidable in said cylinder and dividing it to form a first chamber communicating with said source and a second chamber, a locking member carried by said piston and normally maintained by pressure in said first chamber in the path of travel of said other unit to prevent axial movement thereof, means biasing said piston for movement against pressure in said first chamber whereby when such pressure fails, said piston will move said locking element out of the path of travel of said other unit whereby the latter will be movable by said one unit to effect movement of said pressure responsive member, and means connecting said second chamber to said pressure chamber whereby pressure in said pressure chamber tends to assist said biasing means in moving said piston against pressure in said first chamber.

11. A motor mechanism according to claim 10 wherein said biasing means comprises a spring arranged in said second chamber and engaging said piston, said means connecting said pressure chamber to said second chamber comprising a duct formed in said housing.

12. A motor mechanism comprising a fluid pressure motor having a pressure responsive member provided at one side thereof with a pressure chamber, a valve mechanism comprising a valve seat unit and a valve unit, one of said units being movable relative to the other unit to connect said pressure chamber to a source of pressure, said other unit having abutting engagement with said pressure responsive member and being mounted for coaxial movement with said pressure responsive member, a housing in which said other unit is slidable, a locking element slidable in said housing transversely of the direction of movement of said pressure responsive member and normally occupying a position in the path of travel of said other unit to prevent axial movement thereof, means responsive to pressure in said source for maintaining said locking element in said normal position, and means biasing said locking element for movement out of the path of travel of said other unit whereby, upon a failure of pressure in said source, said locking element will move out of the path of travel of said other unit and such unit will be moved by said one unit to transmit movement to said pressure responsive member, said other unit having a slide surface over which the adjacent end of said locking element is slidable when moved out of the path of travel of said other unit.

13. A motor mechanism according to claim 12 wherein said slide surface is arranged adjacent the periphery of said other unit and extends parallel to the axis thereof.

14. A motor mechanism according to claim 12 wherein said housing is substantially cylindrical and surrounds and slidably supports said other unit, a cylinder carried by said housing, said pressure responsive means comprising a piston in said cylinder and dividing the latter to form first and second chambers the former of which is connected to said source, said biasing means comprising a spring arranged in said second chamber, said other unit having a slide surface of substantial length parallel to the axis of movement of said pressure responsive member and over which the adjacent end of said locking element is slidable.

15. A motor mechanism according to claim 12 wherein said housing is substantially cylindrical and surrounds and slidably supports said other unit, a cylinder carried by said housing, said pressure responsive means comprising a piston in said cylinder dividing the latter to form first and second chambers the former of which is connected to said source, said biasing means comprising a spring arranged in said second chamber, said other unit having a slide surface of substantial length parallel to the axis of movement of said pressure responsive member and over which the adjacent end of said locking element is slidable, and a duct connecting said second chamber to said pressure chamber whereby pressure in the latter assists said spring in tending to move said locking element out of its normal position.

No references cited.